United States Patent Office 3,519,710
Patented July 7, 1970

3,519,710
DIRECT ACTIVE MODIFIED LIVE VIRUS VACCINE IMMUNIZATION AGAINST TRANSMISSIBLE GASTROENTERITIS IN SWINE PIGLETS AT BIRTH
Edmund P. Bass, 9963 Hascall St., Omaha, Nebr. 68124
No Drawing. Filed Aug. 10, 1967, Ser. No. 666,225
Int. Cl. C12k 7/00; A61k 23/10
U.S. Cl. 424—89
6 Claims

ABSTRACT OF THE DISCLOSURE

A vaccine and methods of preparing and administering the vaccine whereby swine, especially piglets, are provided directly with active protection against transmissible gastroenteritis. The vaccine can be administered orally, or by parenteral route and is prepared from virus propagated in cell culture.

---

The present invention relates generally to transmissible gastroenteritis (TGE) in swine and more particularly to a new and improved vaccine for TGE, methods of preparing such vaccine, and a totally new concept for the administration of the vaccine to provide active protection against TGE.

For many years a virulent disease has been known to infect swine herds causing severe illness in adult sows and killing up to 100% of new born piglets up to 15 days of age. An examination of the histories of such attacks, and of the clinical pathology available, resulted in the identification of the agent as transmissable gastroenteritis, or TGE as it is more commonly referred to by swine producers and veterinarians. Although TGE causes most severe losses in baby pigs, the disease effects swine of all breeds and of all ages.

TGE is normally characterized by severe vomiting, profuse diarrhea, and rapid weight loss among baby pigs. The same symptoms, though less severe, are present when older swine are infected. Evidence indicates a very short incubation period for the disease.

Mortality from TGE is highest among baby piglets. Pigs which reach six weeks of age before becoming infected appear to have a good chance to recover. Sows which become infected usually recover in a week or ten days, although they may abort their litters if they are pregnant. The evidence available does not appear to support the theory that pigs are affected en uteri when sows become infected before farrowing. Sows which were infected at least three to six weeks before farrowing and which did recover without aborting are believed to develop an immunity which they could pass on to their nursing litter in their milk. This theory was presented as a basis for one of the early vaccines for TGE, but it has not provided a sound basis for protecting their litter.

How TGE gains entry to a herd and how it remains in an infected area is not completely known at this time. TGE appears as an infection which suddenly arises, causes severe symptoms in a herd at all age levels, kills substantially all piglets which are under 15 days old after the outbreak begins, and then apparently vanishes only to return again at a later time.

In some instances, outbreaks have been traced to new animals brought into the herd. In other instances, the source appears to be delivery trucks which had been used on infected farms before coming to the uninfected farm.

In some instances, starlings and dogs have been considered as carriers, via feces, while in others, man is believed to transmit the virus from one area to another on his shoes or his clothing.

There is no unequivocal evidence on the effects of TGE on the rate of growth on those pigs which survive the disease, but it is known that all infected animals suffer weight losses during the course of the disease. Several farms have reported an excessive number of runts and poor feed conversion by all survivors of the disease. Some farmers have even reported that it is economically prohibitive to continue spending for feed and additional care for the survivors of TGE. It is generally felt that additional runts can be expected and the survivors will require three to six weeks longer to reach market. These effects, of course, further ramify the economic seriousness of TGE.

Thus, for the swine producer who concentrates his major effort in the field or for the farmer who relies heavily upon his income from swine, TGE constitutes a major threat since it can descimate a herd of nearly all its replacement stock and cause serious delays in older swine reaching the market in question in a very short period of time.

While TGE has been reported in all continents of the world, it has become a major economic threat to swine breeders in the United States. According to 1965 figures, it is estimated that over 20,000 herds and in excess of 1,000,000 pigs are infected annually in the continental United States. Since, as already indicated, mortality from TGE runs as high as 90 to 100% in some piglets which are under ten days of age and estimating the value of such piglets at about $7.00 each, the loss to the nation's farm economy is clearly significant.

Of course, these figures do not include the millions of pounds of pork and the attendant dollars from their sale which are lost to the swine producer when TGE prevents a maturation of the piglet harvest.

Reports indicate that Illinois, Indiana, Iowa, Kentucky, Minnesota, Missouri, Nebraska, New Jersey, North Dakota, Ohio and South Dakota are the largest swine producing states in the Untied States and they are also those states which suffer the greatest loss from TGE.

It is readily apparent that something needs to be done to stop TGE.

The only prior art effort to provide a vaccine was based, as alluded to above, on the observation that those surviving sows who did not abort their litters were able through the milk to provide their litter with passive immunity. Specifically, the prior art proposed to vaccinate pregnant sows prior to delivery with an inactivated virus vaccine which was produced from heterologous tissue cultures. As reported by Diamond Laboratories, the tissue culture fluids were harvested when the virus concentration was greatest and the virus was then inactivated. The inactivated virus may be stored in a frozen state and then thawed when needed for use.

The vaccine was used to vaccinate pregnant sows at two months and at one month before farrowing and requires at least four weeks lead time on farrowing if the sow is to develop an immunity which can be transferred to the nursing piglet. Immunity was obtained in piglets only as long as the piglet nursed from the treated sow. Further, the "immunity" in the sow was only transitory and she had to be reinoculated with each pregnancy at both two months and one month prior to farrowing.

This vaccine, while an effort to assist in the control of TGE, nevertheless suffered from many severe disadvantages.

First of all, in the absence of prophylactic mass inoculation, the swine breeder normally does not know two months ahead of time that an outbreak of TGE will occur.

A further disadvantage of the vaccine, as in any transmission of antibodies via colostrum or milk, is that the passive immunity is neither controllable nor predictable.

Still another disadvantage of passive protection arises from the fact that actual experience reveals that only approximately 50% of the litter is protected and that the other 50% are susceptible and may indeed contact the disease.

The present invention is based upon the discovery of a new and novel vaccine which is prepared in a unique fashion and which is administered in accordance with totally new concepts of administration and provides remarkably unexpected protection for young piglets against the threat of TGE.

Accordingly, a principal object of the present invention is to provide a vaccine against TGE which provides substantially complete protection to susceptible pigs from the TGE virus.

Another object of the present invention is to provide a prophylactic measure against TGE which can be employed when needed.

Another object of the present invention is to provide a method of protecting suckling pigs from TGE which does not rely on the possibility of a sufficient protective level of antibodies appearing in mothers milk for protection.

A still further object to the present invention is to provide a prophylactic approach relative to the handling of TGE which does not require tampering with the sow while she is in a pregnant condition.

Still another object of the present invention involves a method of preventing TGE in which a single administration at a preselected time is adequate to avoid the ravages of the disease.

Still a further object to the present invention is to provide a vaccine against TGE which is directly and safely and effectively administrable to new born piglets as well as adult swine.

Still a further object of the present invention is to provide means and methods for treating and protecting herds against TGE which does not require the swine breeder to be clairvoyant as to the possible occurrence of the disease in his herd in the future.

A further object of the present invention is to provide means for protecting young piglets and adult swine against the ravages of TGE in a manner which provides positive active protection to the disease and carries them through the critical suckling period and yet is not dependent upon the nursing of the piglet in order to obtain the immunity.

These and still other objects as shall hereinafter appear are fulfilled by the present invention in a remarkably unexpected fashion as can be discerned from a careful consideration of the following detailed description of the manner and mode of performing the invention best known to me at this time. It is of course understood that the specific embodiments that I will describe are intended to illustrate the contribution that I have made and not in any way act as a limitation upon it.

Let me first describe how I prepare my vaccine.

I find it advantageous to grow in porcine cells, such as primary porcine tissues, cell strain or cell line derived from kidney cells which can be surgically obtained from pigs. These could also be lung, testicle, uterus, or other tissues.

I grow my porcine cell strain from primary porcine tissue in a suitable growth media such, for example, as Eagle's or Parker's, into which serum, lactalbumen hydroylsate and antibiotics are added. The vessel is normally of sterile glass. I permit the cell growth to continue until a desired concentration of suspended cells is obtained or a confluent cell sheet or monolayer is formed. When the monolayer is completely formed, I remove the growth media as by decantation and detach the confluent sheet by the addition of a trypsin or a trypsin-versine suspension. The trypsin-versine suspension has the facility to detach the cells from the glass and from each other. I then centrifuge the trypsin-versine solution out of the cells and re-suspend the discrete cells in fresh growing media of the type used before. I have also found the addition of a suitable preservative such as DMSO to be helpful and at this time, I may fill suitable ampules with the growing media containing the suspended-discrete cells and preservative and freeze them at a temperature of from about 0° C., when only short term storage is required, to about −50° C. or lower when long term storage is desired.

This second growing media or "maintenance media" as it might be more properly called, is substantially identical in composition to my original growth media, except that I normally reduce the amount of serum disposed therein.

When I desire to produce my TGE vaccine, I add the cells into the maintenance media; or after I thaw the cell-media if it had been frozen. Next, I add to the cells and media a suitable TGE seed virus. My TGE seed virus may be either a field virus, obtained from the infected pigs, purified and attenuated to non-virulent state by serial passage through viable porcine cells or cell strain; or it may be one of the adapted viruses available from recognized research centers, such as Purdue University (West Lafayette, Ind.), Ohio State University (Columbus, Ohio) and the like. The Purdue strain of TGE seed virus is known generally as the "Purdue Isolate" and will be herein so called.

After the virus has been added to the maintenance media which covers the primary cells (cell line or cell strain, when appropriate), virus multiplication is effected by incubation of the material at a temperature of from 30–38° C., preferably at about 37° C., until a maximum titer is reached.

The titer of the harvested virus is determined by CPE (cytopathogenic effect), or by fluorescent antibody method. Both of these are standard laboratory procedures in the field of virology and do not require any detailed description at this time.

The vaccine is prepared by suspending the virus-laden media in a suitable stabilizing medium, such for example, as peptones, protein (agar, gelatin, etc.), sugars (lactose, sucrose, rhamnose, etc.) or the like. The product may then be packaged as a liquid product or it may be desiccated by lyophilization. If the final product of choice is the desiccated product, it is reconstituted by the simple addition of a sterile diluent such as buffered distilled water or the like. The liquiud product is, of course, ready for use as packaged.

The vaccine thus prepared has been found to be highly suitable for the vaccination of piglets and it has been found that the administration may be either per os or parenterally although maximum benefits are obtained when oral administration is employed.

As is shown in the following detailed examples which are herein presented to illustrate but not limit the invention, exceedingly remarkable results have been obtained utilizing this vehicle in the manner indicated. As will be noted, it has been found that a distinct and positive protection is provided for the piglets and there is no tampering and no risk to the sows. Further, my vaccine enables the swine grower to provide immediate and positive protection to a herd which encounters a "surprise attack" of TGE virus.

The safety and efficiency of my vaccine was demonstrated in a series of tests which are reported below in Examples I et seq.

EXAMPLE I

Two serials of vaccine were prepared in accordance with this invention as described above. The vaccine was tested for potency by administering it orally to new-born piglets. Litter-mate controls were left with the vaccinates and all piglets were with the sow. Three to five days later, vaccinates and controls were challenged with 1000 Lethal Doses of virulent gut material. Following the challenge, the vaccinates did not show any reaction while all of the controls died with typical symptoms of TGE.

EXAMPLE II

The degree of attenuation and immunogenic properties of the virus were determined by and at the Department of Veterinary Science of the University of Nebraska, Lincoln. Neb.

A litter of hysterectomy-derived and colostrum-deprived piglets were vaccinated 18 to 24 hours after birth. The vaccine was given orally. Forty-eight hours after vaccination, the piglets were challenged orally with 1 cc. of virulent gut material containing 1000 Lethal Doses. Following vaccination, none of the vaccinates showed any reaction. Following challenge, five out of six vaccinates remained normal and one died three days post-challenge. The control piglet died two days after challenge.

The experiment demonstrated that the virus is attenuated to the degree that it does not cause any reaction in SPF pigs and that it is antigenic to protect five out of six animals against a challenge containing 1000 Lethal Doses. "SPF pigs," as is well known to the art, are pigs which are specific pathogen free (hence "S.P.F.").

EXAMPLE III

Further tests were performed to demonstrate the safety and the efficacy of both the product and the methodology of the present invention as follows:

Piglets were vaccinated at the time of birth, six, twenty-four, forty-eight and seventy-two hours after birth.

None of the animals showed any reaction following vaccination.

The several animals were challenged simultaneously with the administration of the vaccine and also 1, 2, 7, 11 and 22 days post-vaccination.

The vaccinated animals remained protected against challenge on the average of over 91% while over 97% of the controls succumbed to the challenge.

The foregoing experiments are summarized in the tables below and indicates that about twenty-four hours are needed to protect piglets against challenge containing 1000 Lethal Doses.

TABLE 3-A.—SUMMARY OF VACCINATION/CHALLENGE WITH ORAL TGE VACCINE IN NEWBORN PIGLETS

| No. of Piglets | Vaccination Age, hours | Challenge Days After Vaccination | Results | | Remarks |
|---|---|---|---|---|---|
| | | | Vac. | Controls | |
| 6 | 24 | 0 | 4/4 | 2/2 * | No protection. |
| 13 | 48 | 2 | 2/9 | 4/4 | |
| 10 | 6 | 2 | 2/7 | 3/3 | |
| 12 | 24 | 7 | 0/9 | 3/3 | |
| 6 | 48 | 2 | 1/5 | 1/1 | |
| 10 | 72 | 5 | 0/7 | 3/3 | |
| 7 | 48 | 1 | 1/5 | 2/2 | |
| 14 | 24 | 2 | 0/9 | 5/5 | |
| 6 | 24 | 21 | 0/5 | 0/1 | |
| 5 | 24 | 10 | 9/2 | 3/3 | |
| 11 | 48 | 13 | 0/8 | 3/3 | |
| 100 Total | | | [1] 6/68 | [2] 27/28 | |

[1] 91.9% Prot.
[2] 96.8% Dead.

More particularly, two litters of newborn piglets were used in the experiment. The piglets were forty-eight hours old at the time of inoculation.

The virus used was lot 16–49 tissue culture origin TGE virus. Titer as determined by CPE end point was $10^{5.5}$ at the time of inoculation.

In the actual test, four piglets from one litter and six piglets from the second litter were inoculated with 3.0 cc. of the virus described above as follows: 1.0 cc., intraperitoneally; 1.0 cc., orally; and 1.0 cc., intravenously via the marginal ear vein. Two piglets from each litter were left as uninoculated normal contact controls. The piglets were observed daily for a period of ten days for any untoward symptons of TGE. On the fourteenth day, all of the piglets were challenged orally with 100 Pig Infective Doses (PID) of a virulent strain of TGE virus.

None of the inoculated piglets showed any of the commonly recognized symptoms generally associated with the TGE syndrome. The piglets remained healthy, active, and on feed throughout the observation period. Three of the test pigs died accidenally; these were the only losses incurred during the test period.

None of the vaccinated piglets reacted to challenge. No transistory symptoms were noted. Two of the contact control died on the second and fourth days post-challenge respectively. The remaining challenge had a severe reaction in the form of diarrhea and vomiting and was still sick when the final report on the test was prepared.

From the foregoing, it may be concluded that my modified live TGE virus is not only attenuated to a safe degree, but that it can be safely used as a vaccine.

EXAMPLE V

To perform the spreading test, a single litter was used comprising ten viable piglets. At three days of age, seven of the piglets were vaccinated orally with 2.0 cc. of vaccine and three were left unvaccinated as contact controls. All of the piglets were kept together.

On their eighth day of life (five days post-vaccination), all of the piglets were challenged with 1.0 cc. of virulent TGE virus at $10^{-4}$ dilution (equivalent to 1000 Pig Infective Doses). The challenge was administered orally.

Forty-eight hours after challenge, two vaccinates had a mild diarrhea. No evidence of vomiting was noted. All of the other vaccinates were normal.

The three controls showed signs of severe diarrhea, vomiting and were visibly ill.

In the seventh day post-challenge, two controls died. The third control continued to be visibly sick with severe diarrhea and vomiting. None of the vaccinates were visibly ill at this time. The experiment was concluded on the tenth post-challenge day with all vaccinates normal and the surviving control in an improved condition.

There was thus demonstrated that the virus did not spread from the vaccinated to the unvaccinated animals.

EXAMPLE VI

In order to demonstrate if the vaccine strain of virus reverts to virulence if back passaged, two piglets were given 5 cc. of seed virus orally. One day later one piglet was sacrificed; its small intestine with the contents removed, ground and given orally to two other piglets. This back passage was repeated for six times. Three days after the sixth passage, all of the piglets were challenged with 100 Pig Infective Doses of virulent TGE virus (Nebraska strain).

None of the pigs showed any reaction following back passage.

After challenge, one surviving piglets of the sixth passage died with typical symptoms of TGE. Unvaccinated contact controls were kept throughout the experiment together with the inoculated animals. Following challenge all controls died with typical symptoms of TGE, while all inoculated animals survived.

This demonstrates that the virus was passed for five times and did not revert to virulence.

EXAMPLE VII

The challenge virus employed in Examples I–VI was the Nebraska strain and it was used in the form of gut material having at titer of $10^{-7}$ per one ml. Approximately 1000–3000 Lethal Doses was used for challenge of the piglets.

TABLE 3–B.—SUMMARY VACCINATION OF CHALLENGE DATA OF PIGLETS OF VARIOUS AGES

|  | Time from Vaccination to Challenge | No Dead or Sick/ No Challenged | |
|---|---|---|---|
|  |  | Vac. | Controls |
| Age of Piglet at Vaccination: |  |  |  |
| 6 hours | 2 days | 1/7 | 3/3 |
| 2 days | 1 day | 2/9 | 4/4 |
| 3 days | 5 days | 0/7 | 3/3 |

STATISTICAL SUMMARY OF ALL PIGS VACCINATED AND CHALLENGED TO DATE

|  | Percent protection | Percent dead or sick |
|---|---|---|
| Total No. of Piglets Sick or Dead, 3 | 92.3 | 7.7 |
| Total No. of Piglets Vaccinated, 39 |  |  |
| Total No. of Controls Sick or Dead, 18 |  | 94.7 |
| Total No. of Piglets Challenged, 19 |  |  |

EXAMPLE IV

To demonstrate the safety of my vaccine, piglets were given simultaneously 1 cc. of seed virus orally, intravenously and, also, intraperitoneally. Two litter-mate piglets were left as the controls. All animals were kept together and observed for fourteen days and then challenged with virulent material. Following administration of the vaccine no reaction was observed. Following challenge, all vaccinates remained normal; the controls died with typical symptoms of TGE.

The foregoing demonstrates that the vaccine is safe and does not produce any untoward reaction in the pigs when given simultaneously, orally, intravenously and intraperitoneally.

EXAMPLE VIII

The object of this experiment was to determine the efficacy of my TGE vaccine when it is challenged with a combination of different virulent TGE isolates at a known infectious dose assay.

As a challenge virus, I used five isolates (strains) of infected gut material respectively designated as Illinois, Iowa, Purdue, New York, and Nebraska. Titer on each isolate was established and expressed as pig infectious doses (PID). Each isolate was then prepared to contain 1000 PID/ml., and 1.0 cc. of each isolate containing 1000 PID was pooled together. This mixture was then titrated in piglets. Results are indicated in Table 8–A. This suspension of pooled virus was used as an oral challenge on a potency evaluation.

Table 8–A

Virus: Combined Chal. Virus _____ CC
Dilution:
    $10^{-1}$ _____ Dead
    $10^{-2}$ _____ Dead
    $10^{-3}$ _____ Sick
    $10^{-4}$ _____ NR
Titer:
    1,000 _____ PID/ml.

To determine potency, a litter of at least eight piglets from 0–48 hours old was vaccinated with one dose of vaccine. Three days after vaccination, the vaccinates plus controls were challenged with virus preparation as described above. 1.0 ml. of the mixed virus suspension was given to each animal orally.

The vaccine passed potency by showing protection in 80% of the piglets vaccinated while all controls died. Table 8–B summarizes the results.

Table 8–B

Days to chal. _____ 3
No. vac. surviving no. chal. _____ 4/5
No. controls dead no. chal. _____ 2/2

EXAMPLE IX

To further demonstrate the effectiveness of my vaccine when administered orally to newborn piglets at diluted dose levels, I divided one litter of nine newborn piglets into three groups. To one group of four piglets, I orally administered 1 cc. of vaccine orally. To the second group of four piglets, I orally administered 0.5 cc. of vaccine. The third group consisted of one piglet which became my contact control. All three groups were left with the sow during the test. All of the piglets were challenged three days after vaccination with 1000 PID/piglet of Nebraska isolate of virulent TGE.

None of the vaccinated piglets showed any reaction following challenge whereas the control piglet developed diarrhea and vomiting on the third day and died on the seventh day post challenge.

EXAMPLE X

To further verify the efficacy of the TGE vaccine, tissue culture origin, modified live virus, of the present invention, I set up a test involving piglet having a concurrent or immediate post-vaccination contact exposure to TGE.

A litter of eight naturally-farrowed piglets was divided into three groups of four, three and one piglet, respectively. To the group of four piglets, I orally administered 1.0 cc. of my TGE vaccine. The group of three piglets was used as the uninoculated contact controls while the group of one piglet became my challenge piglet.

The challenge piglet was challenged two days after vaccination with a virulent gut suspension of the Iowa isolate equivalent to 1000 PID. All piglets were held with the sow in close contact with each other throughout the test.

Observations were made daily for evidence of TGE symptoms. The challenge piglet developed diarrhea and was obviously ill the second day post-inoculation. The diarrhetic condition remained for four days followed by recovery.

Two of the three contact controls developed moderate to slight diarrhea which lasted for two to three days and was followed by recovery.

None of the vaccinates showed any symptoms of TGE.

EXAMPLE XI

The test described in Example X was repeated with piglets of 4–10 hours of age. There were four vaccinates, five contact controls and two challenge piglets. The Nebraska isolate was used for the challenge and the two challenge piglets were challenged at the time of vaccination.

The two challenge piglets became sick with typical symptoms of TGE and died on the 6th and 7th day post-challenge. All contact controls became sick and four died. The fifth recovered but its growth was definitely stunted. The vaccinates showed mild diarrhea but remained alert and normal.

EXAMPLE XII

The test procedure of Example X was repeated with a third litter. Six piglets were vaccinated and at the same time one piglet was inoculated with challenge gut material (Nebraska isolate). Two controls were kept separate while the vaccinates, and the challenged piglet, were kept together. The vaccinates did not show any reaction while the challenged piglet showed typical symptoms of TGE.

On the eighth day all of the vaccinates and the two controls were challenged with 1000 PID of the Nebraska isolate. Again the vaccinates did not show any reaction while one of the controls showed typical TGE symptoms.

The second control died accidentally and therefore could not be considered in final evaluation of the test.

From the foregoing description and examples, it becomes apparent that I have developed a vaccine to provide position protection against TGE for swine which is vastly superior to anything heretofore available. It is also apparent that my novel approach in administering vaccine to newborn piglets, either by per os or parenteral routes but preferably orally, provides a totally new concept to the TGE problem. It is also apparent that my novel vaccine, prepared by and employed according to my teaching provides a remarkably unexpected and highly beneficial degree of protection against TGE for newborn piglets during the critical first three months of life and thereafter. It is further shown that my vaccine, even when diluted 1:4 is still highly effective so that the only practical lower limit on dosage is that the amount administered to the piglet be capable of invoking the development of a specific resistance and the production of antibodies followed by durable immunity against TGE without the appearance of the usual symptoms of the disease. Higher concentrations of vaccine are shown to be effective without any side effects so that litter economics become the only factor which will dictate how close to a minimal amount need be used. Standard serological analysis permits a ready means for determining an empirical value for the minimum dose and is already known to the artisan without detailed explanation here.

It is, of course, understood that such modification, adaptations and alterations as may readily occur to the artisan when confronted by this disclosure are intended to be embraced within the spirit of the invention especially as it is defined by the scope of the claims appended hereto.

Accordingly, what is claimed is:

1. The method of providing direct active immunization against transmissible gastroenteritis of TGE-susceptible swine piglets which are deprived of colostrum as well as piglets which are nursing sows, which sows may or may not be TGE-immune dams, where there may or may not be a possibility of sufficient protective level of TGE antibodies appearing in mother's milk for protection, such material-antibody-passive immunity, if transmitted via colostrum or mother's milk, being neither controllable nor predictable, said piglets ranging in age from newborn to not over about three months of age, said method comprising: administering orally or parenterally to said swine piglets, a modified live virus transmissible gastroenteritis vaccine in an amount capable of invoking the production of antibodies and the development of a specific resistance to and durable immunity against TGE without the appearance of the usual symptoms of the disease; said vaccine being prepared by: disposing primary porcine tissue in growth media; maintaining said tissue in said media until a confluent cell sheet is formed; removing the growth media from said cell sheet; disrupting the cell sheet into discrete cells; suspending said discrete cells in maintenance media; adding virulent transmissible gastroenteritis seed virus obtained from infected pigs to said suspension; incubating said virus media suspension until maximum titer is reached, said high titer virus-media suspension being transmissible gastroenteritis virus; and attenuating the virus by serial passage through viable porcine cells until it does not cause any reaction in SPF pigs and is antigenic to protect against lethal challenge.

2. The method of claim 1 in which said administration is orally.

3. The method of claim 2 in which said piglet is from one to seven days old.

4. The method of claim 1 wherein the discrete cells are frozen and later thawed prior to suspension in maintenance media.

5. The method of claim 1 wherein said high-titer virus-media suspension is mixed with a stabilizing medium.

6. The method of claim 1 wherein said high-titer virus-media suspension and said stabilizing media is lyophilized.

References Cited

UNITED STATES PATENTS 3,127,318  3/1964  Eversole et al. _____ 424—89

FOREIGN PATENTS 669,881  3/1966  Belgium.
1,058,340  2/1967  Great Britain.

OTHER REFERENCES

Sheffy, B. E., Veterinary Bulletin 37(4) p. 233, Abstract #1259, April 1967.

SHEP K. ROSE, Primary Examiner

U.S. Cl. X.R.

195—1.1, 1.3, 1.5, 1.8

UNITED STATES PATENT OFFICE

CERTIFICATE OF CORRECTION

Patent No. 3,519,710                          July 7, 1970

Edmund P. Bass

It is certified that error appears in the above identified patent and that said Letters Patent are hereby corrected as shown below:

In the heading to the printed specification, line 6, "Edmund P. Bass, 9963 Hascall St., Omaha, Nebr. 68124" should read -- Edmund P. Bass, Omaha, Nebr., assignor to Armour Pharmaceutical Company, Chicago, Ill., a corporation of Delaware --.

Signed and sealed this 19th day of January 1971.

(SEAL)
Attest:

Edward M. Fletcher, Jr.                    WILLIAM E. SCHUYLER, JR.
Attesting Officer                           Commissioner of Patents